United States Patent [19]
Merten et al.

[11] Patent Number: 5,947,265
[45] Date of Patent: Sep. 7, 1999

[54] CHAIN DRUM ARRANGEMENT FOR SCRAPER CHAIN CONVEYORS

[75] Inventors: Gerhard Merten, Lünen; Adam Klabisch, Dortmund; Bernd Steinkuhl, Lünen, all of Germany

[73] Assignee: DBT Deutsche Bergbau-Technik GmbH, Germany

[21] Appl. No.: 08/905,609

[22] Filed: Aug. 4, 1997

[30] Foreign Application Priority Data

Aug. 17, 1996 [DE] Germany .......................... 196 33 207

[51] Int. Cl.⁶ .................................................. B65G 23/06
[52] U.S. Cl. ........................ 198/834; 474/155; 474/164; 474/902
[58] Field of Search ............................ 198/834; 424/164, 424/155–157, 902

[56] References Cited

U.S. PATENT DOCUMENTS

| | | | |
|---|---|---|---|
| 3,213,703 | 10/1965 | Fitzgerald | 198/834 |
| 3,805,631 | 4/1974 | Kerklies | 474/164 |
| 4,037,713 | 7/1977 | Soliman et al. | 198/834 |
| 4,049,112 | 9/1977 | Tyslauk | 198/834 |

FOREIGN PATENT DOCUMENTS 196 19 821   11/1997   Germany .

*Primary Examiner*—Jospeh E. Valenza
*Attorney, Agent, or Firm*—Vickers, Daniels & Young

[57] ABSTRACT

This invention relates to a chain drum arrangement for a central or double central scraper chain conveyor, comprising a divided chain wheel, the shell-type chain wheel segments of which are attached, locked in rotation and detachably, via an axial splined portion to the shaft, wherein the chain wheel is secured in its installed position on the shaft by means of locking rings disposed on both sides and at least one of these two locking rings consists of a divided locking ring which can be taken off radially from the shaft in order to remove the divided chain wheel from the shaft. According to the invention, the divided locking ring is disposed as an intermediate ring between the divided chain wheel and a hollow journal which receives the respective shaft bearing and which projects axially from the respective side cheek of the machine frame into the interior space thereof, which results in a narrow mode of construction of the divided locking ring.

25 Claims, 6 Drawing Sheets

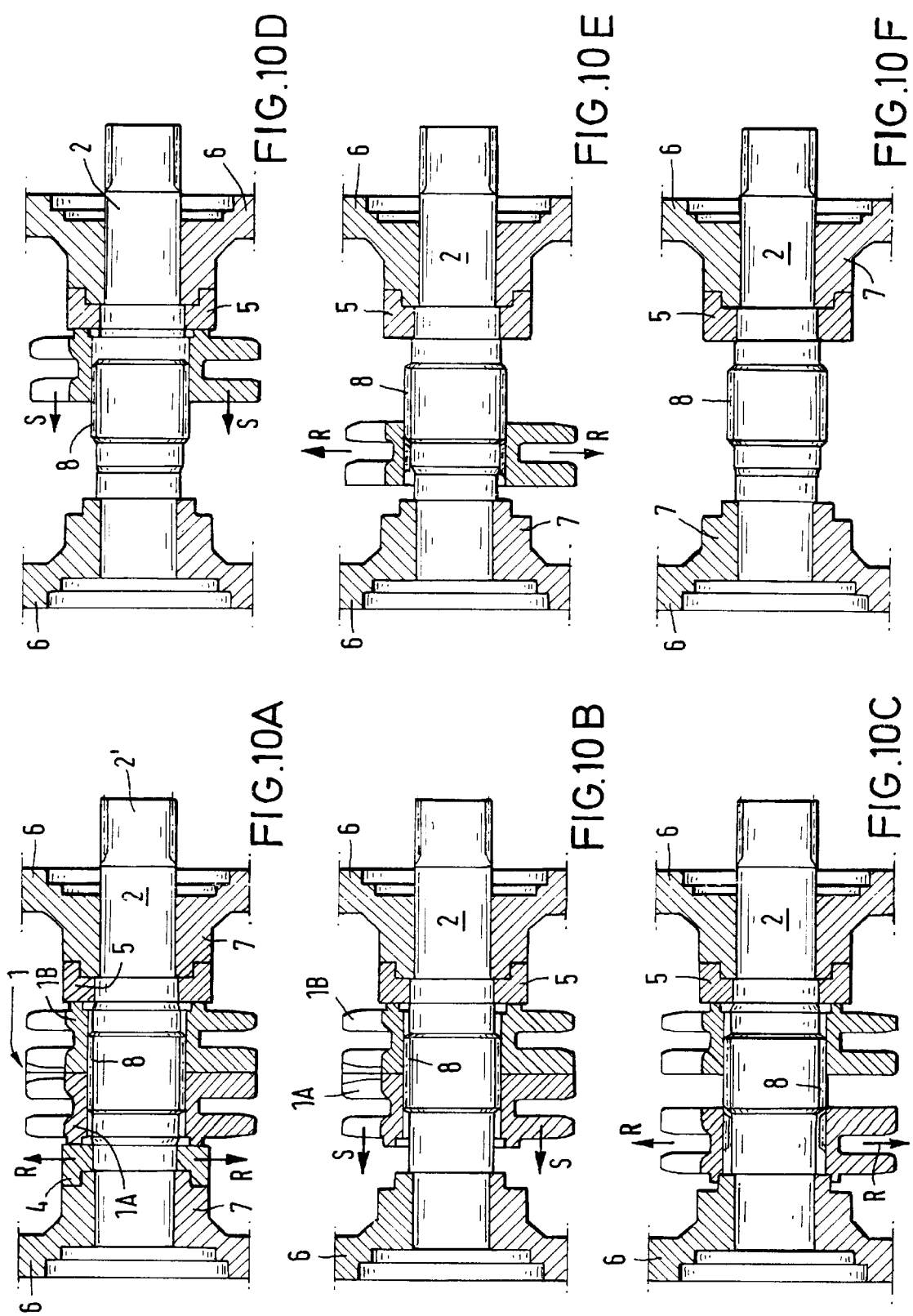

CHAIN DRUM ARRANGEMENT FOR SCRAPER CHAIN CONVEYORS

FIELD OF THE INVENTION

This invention relates to a chain drum arrangement for central or double central scraper chain conveyors.

BACKGROUND OF THE INVENTION

Prior German Patent Application 196 19 821.6 relates to a chain drum of the general type with which the present invention is concerned. The rotationally locked attachment of the divided chain wheel to the drive shaft mounted in the machine frame of the scraper chain conveyor is effected here in the usual manner by means of a splined portion, whilst the locking rings formed from the divided sleeves or ring parts are attached locked in rotation to the shaft via tongue and groove joints. Since the planes of separation of the locking rings, which are each formed from two half rings, are disposed displaced in the circumferential direction of the chain drum shaft in relation to the plane of separation of the chain wheel, which consists of shell-type chain wheel segments, a design of the chain drum is possible in which the chain wheel segments are held together by the positive engagement around them of the locking rings, and the screwed connections on the locking rings are relieved from the high operating forces so that no breakage of the screwed connections can occur in operation. The locking rings form drum bushings of relatively large width dimensions with the chain wheel.

SUMMARY OF THE INVENTION

Starting from the chain drum arrangement of the aforementioned type, the underlying object of the present invention is principally to fashion this arrangement for scraper chain conveyors comprising a chain drum arrangement which is provided with a single or double central chain belt in a manner such that the installation and removal, and thus the replacement, of a divided chain wheel, which is subjected to considerable wear during a conveying operation, is made easier.

The present invention provides a chain drum arrangement in which a chain wheel is held on a shaft with one or more divided locking rings (ring parts) the divided locking ring or each divided locking ring being disposed as an intermediate ring between the divided chain wheel and a hollow journal which receives the respective shaft bearing and which projects axially from a respective side cheek of a machine frame of the conveyor into the interior space thereof. In this respect, both ring parts are preferably designed as divided locking rings which can be taken off radially from the shaft, although it is also possible to employ a divided locking ring for one of the two ring parts only, whilst the other ring part is constructed as a one-piece, closed locking ring. The two locking rings are coupled to the shaft and/or to the chain wheel so that they rotate with the chain wheel during a conveying operation. In this respect, the two locking rings are preferably detachably coupled to the divided chain wheel for rotational entrainment.

In the chain drum arrangement according to the invention, the divided chain wheel which is attached locked in rotation via the splined portion to the drive shaft is disposed between two ring parts forming the locking rings, which secure the divided chain wheel, in engagement with the splined portion, against axial displacement on the shaft and which optionally also secure it radially in relation to the shaft axis, and at least one locking ring of which is designed as a divided locking ring so that it can be taken off the shaft for the installation or removal of the chain wheel. In this respect, the width of the divided locking ring is preferably designed so that after its removal from the shaft a free space is present near the shaft section which carries the splined portion, into which free space the divided chain wheel can be displaced with the toothed engagement of the splined portion being released, so that the shell-type chain wheel segments can then be taken off radially from the shaft and can be replaced by new chain wheel segments if need be. The locking rings can be of relatively small width, since they are disposed as intermediate rings between the fixed hollow journal on the side cheeks of the machine frame which receives the shaft bearings and the divided chain wheel. The divided locking ring therefore forms a component of relatively low handling weight which is easy to manipulate when the divided chain wheel is installed, whereby the work of installation and removal is made easier. Moreover, the arrangement is preferably designed so that the divided locking ring or each divided locking ring consists of ring segments which are detachably joined by a screwed connection comprising screws disposed approximately parallel to the tangential direction of the shaft. The locking rings are preferably provided with annular flanges or retaining collars or the like, by means of which they fit over lateral shoulders of the divided chain wheel. The divided locking ring or locking rings are preferably installed in such a way that their plane of separation is displaced circumferentially in relation to that of the divided chain wheel, whereby the screwed connection of the locking ring or locking rings may be relieved of the high operational stresses.

In a further advantageous embodiment of the invention, gap ring seals are provided which close the gaps between the locking rings and the fixed hollow journal which receives the shaft bearings. In this respect, the locking rings advantageously comprise an annular internal recess, which is preferably stepped, for receiving the sealing element of the gap ring seal. Sliding ring seals which are known in the art are preferably used for the gap ring seal, the sliding ring support of which, which rotates with the shaft, is detachably attached locked in rotation to the respective locking ring, whilst the non-rotating sliding ring support is disposed in the hollow journal. The sliding ring support which rotates with the shaft can be rotationally locked to the respective locking ring, via axial pegs or dowel pins and the like the locking ring being provided with grooves on its internal circumference which are open towards the shaft for the engagement of the pegs or dowel pins, whereby the rotational entrainment of this sliding ring support is effected. The locking rings therefore form receiving parts in this embodiment for the said sliding ring seals.

It is preferred that the shell-type chain wheel segments of the divided chain wheel be detachably joined, on the locking ring side at least, via a removable retaining ring, whereby the engagement of the chain wheel segments with the splined portion of the shaft is secured. The retaining rings are preferably disposed here on the annular lateral shoulders of the chain wheel over which the aforementioned retaining collars of the locking rings fit. The retaining rings can thus at the same time serve for the rotational entrainment of the locking rings. This can be accomplished in a simple manner by providing the retaining rings and the outer retaining collars, which cover them, of the locking rings, with formations, such as flattened portions on their annular external contour for example, which serve for the positive rotational attachment of these parts. The retaining ring is advantageously provided, at least on the side of the divided locking ring, with tool insertion openings and/or with tapped holes for a pulling-off screw, so as to be able to pull off the respective retaining ring from the divided chain wheel after removing the divided locking ring.

It is also possible to equip the locking rings with cams on their face facing the chain wheel, which cams engage in recesses on the side faces of the divided chain wheel and which thus effect the rotational entrainment of the locking ring with the chain wheel. These cams may consist of small screwed-on plates or the like.

On a divided chain wheel for a double central scraper chain conveyor in particular, the width of the two locking rings is preferably designed so that it is less than that of the chain wheel. It is also preferable as regards the narrow mode of construction of the locking rings if the axial splined portion only extends over part of the width of the chain wheel in the central region of the shaft.

In a preferred use of the arrangement according to the invention for a double central scraper chain conveyor, the chain wheel preferably consists of two chain star wheel parts which are disposed side by side on the shaft and each of which is formed from two shell-type chain wheel segments. The two chain star wheels, each of which is divided, can thereby be taken off the shaft or inserted thereon when the locking ring is removed, without the divided locking ring having to be of a width which corresponds to the overall width of the double chain wheel. The two chain star wheel parts of the chain wheel are advisedly disposed on the splined portion of the shaft so that their planes of separation are displaced in relation to each other in the circumferential direction of the shaft, preferably by 60° to 70°, whereby a favourable transmission of the drive torque from the shaft to the chain wheel is also achieved. It is also recommended that the two chain star wheel parts be detachably coupled to each other in their rotationally displaced installed position via an axial positioning pin or the like. The chain star wheel parts may also comprise blind holes disposed on a common reference circle on their mutually facing side faces, for the engagement of axial tapered bolts or the like, which bolts detachably bolt the chain star wheel parts together for the transmission of torque to the double central chain belt.

On a divided chain wheel, the plane of separation between the shell-type chain wheel segments is advisedly placed so that it runs out at its two ends into a tooth gap of the chain wheel. If the chain wheel or each chain star wheel part of the same has an odd number of teeth, the plane of separation of the chain wheel or of the chain star wheel part is a kinked plane of separation, the two limbs of which are inclined in relation to each other at an obtuse angle, wherein the two shell-type chain wheel segments each have a different arc length and a different number of teeth.

The invention is described in more detail below with reference to the examples of embodiments shown in the drawings.

BRIEF DESCRIPTION OF THE DRAWINGS

FIGS. 10A to 10F are schematic, simplified illustrations showing the removal procedure for the chain drum arrangement shown in FIGS. 1 to 9.

DETAILED DESCRIPTION OF THE EMBODIMENTS

Figure 1:
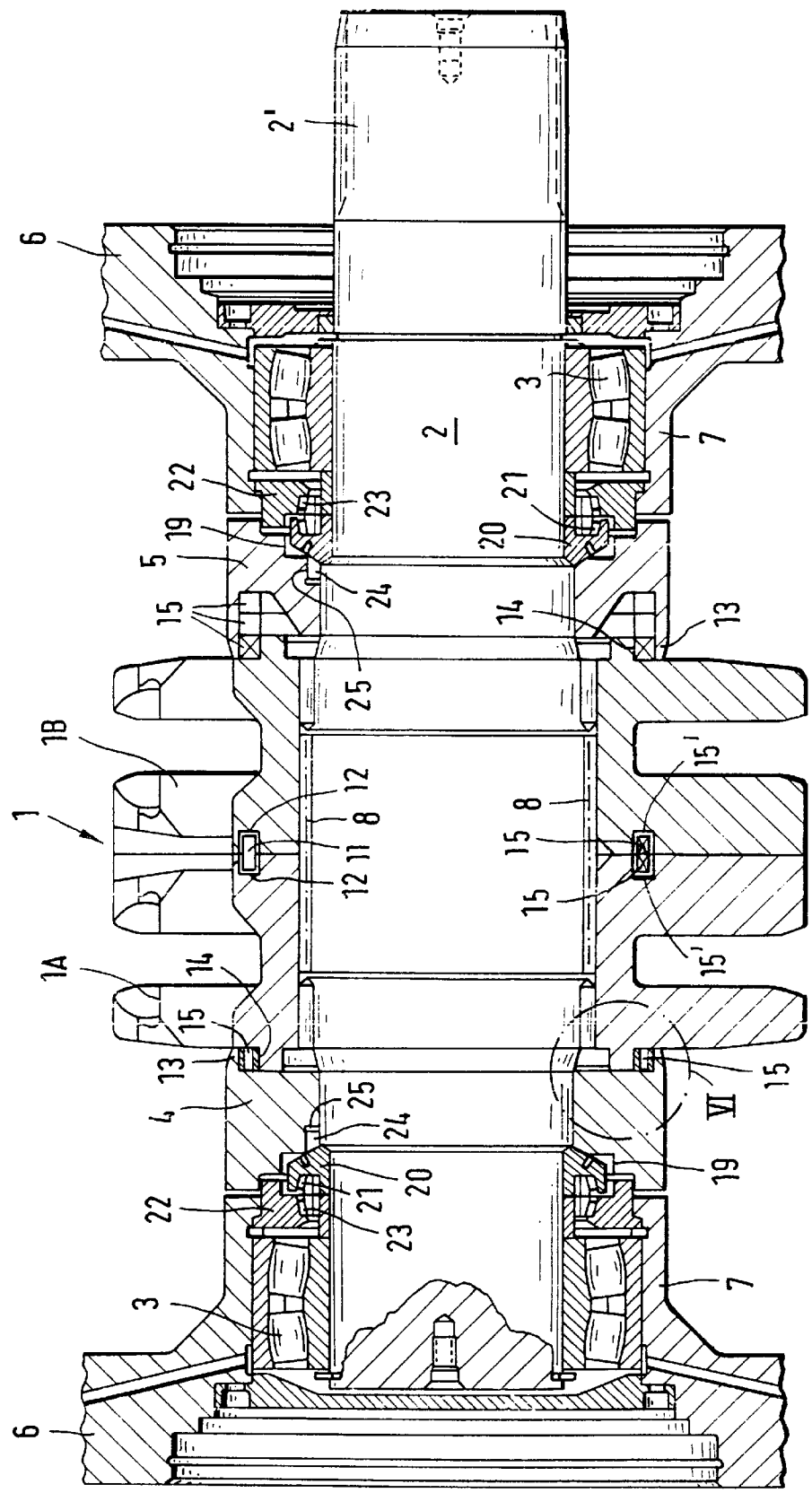
FIG. 1 is an axial section through a chain drum arrangement according to an embodiment of the invention for a double central scraper chain conveyor, showing parts of the machine frame.

The main parts of the chain drum arrangement which is shown in FIGS. 1 to 7 are a divided chain wheel 1, a shaft 2 which carries this chain wheel and which is mounted on both sides of the chain wheel 1 in shaft bearings 3 consisting of rolling bearings, and ring parts which are disposed on both sides of the chain wheel 1 and which form locking rings 4 and 5. In FIG. 1, two vertical side cheeks 6 of the machine frame of the scraper chain conveyor which receives the chain drum are merely shown in the region of the shaft mounting and of the cheek apertures which are disposed on them. A hollow journal 7, which projects axially into the interior space of the machine frame, is fixedly disposed on each of the side cheeks 6, and receives the respective shaft bearing 3 of the shaft 2; the shaft end 2' on the driving side is led out of the machine frame at the side. In the central region of the machine frame, the shaft 2 has a shaft section which is provided with an axial splined portion 8. The chain wheel 1, which is provided with a corresponding counter-splined portion, is in engagement with this splined portion for the transmission of torque. The two locking rings 4 and 5 form intermediate rings between the inner ends of the hollow journals 7 and the divided chain wheel 1. The diameter of the shaft 2 is reduced on both sides of the central section which carries the splined portion 8.

Figure 2:
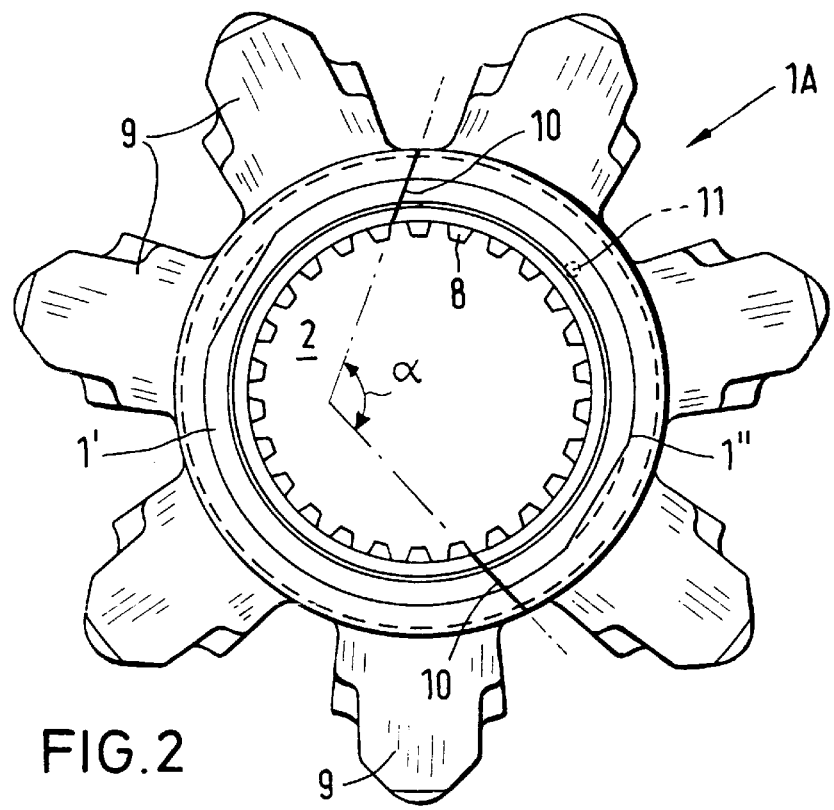
FIGS. 2 and 3 are each end views of the chain star wheel parts which are provided in the chain drum arrangement shown in FIG. 2, in their installed position with planes of separation which are displaced in relation to each other.
Figure 3:
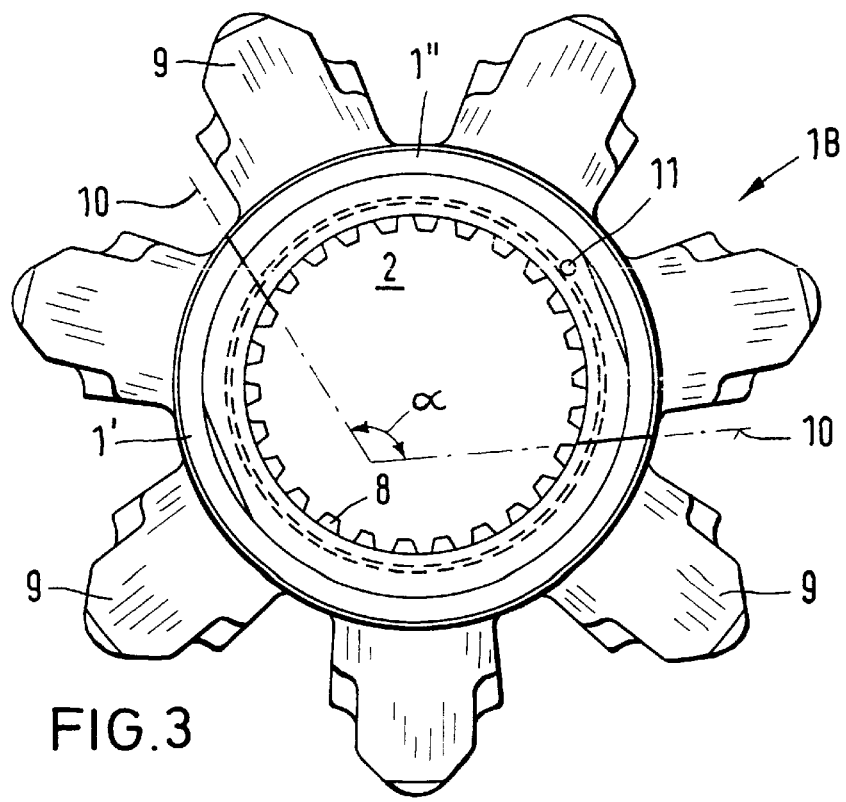

The chain wheel 1 is constructed as a double chain wheel for a double central scraper chain conveyor, and accordingly comprises two separate chain wheel parts or chain star wheels 1A and 1B, which may be of identical construction to each other and which each consist of two shell-type chain wheel segments 1' and 1". Each chain star wheel part 1A and 1B is therefore of divided construction, and in the embodiment shown has an odd number of teeth, namely seven teeth 9 here. The plane of separation of the chain wheel or of each of its two chain star wheel parts 1A and 1B is denoted in FIGS. 2 and 3 by 10, and runs in each case within a tooth gap between two adjacent teeth 9 of the respective chain star wheel part. Consequently, each chain star wheel part 1A and 1B consists of two shell-type chain wheel segments 1' and 1" of different arc lengths and with different numbers of teeth. In the embodiment illustrated, chain wheel segment 1' has the greater arc length and is provided with four teeth 9 which are disposed distributed over the arc length, whilst the other chain wheel segment 1" with the smaller arc length carries three teeth 9. The different arc lengths of the chain wheel segments 1' and 1" result, at each chain star wheel part 1A and 1B, in a kinked butt joint or plane of separation between the two chain wheel segments 1' and 1". The two limbs of this plane of separation coincide at a vertex point which is displaced towards the centre of the chain star wheel part, and are inclined in relation to each other here at an angle α which is preferably about 110° to 120°. As shown in FIGS. 2 and 3, the two chain star wheel parts 1A and 1B are installed on the shaft 2 of the chain drum via the splined portion 8 so that their planes of separation 10 are displaced in relation to each other in the circumferential direction of the shaft 2, preferably by angle of 60° to 70°. This angularly displaced installed position of the two chain star wheel parts 1A and 1B which form the chain wheel 1 results in an improvement in the transmission of torque from the shaft 2 via the chain wheel 1 to the two scraper chains during a conveying operation.

It can be seen from FIG. 1 that the axial length of the splined portion 8 is less than the width of the chain wheel 1 which is constructed as a double chain wheel, and that the width of the two locking rings 4 and is less than the width of a single chain star wheel part 1A or 1B. In their installed state, the two chain star wheel parts 1A and 1B are situated with their side faces seated against each other, and are fixed in relation to each other in different positions of angular rotation, as shown in FIGS. 2 and 3, via a dowel pin or positioning pin 11 which fits into blind holes 12 in the chain star wheel parts. At the same time, as described below in connection with FIG. 8, the two chain star wheel parts 1A and 1B can be detachably coupled in the direction of rotation on their mutually facing side faces via pegs or pins which fit into blind holes in the chain star wheel parts, so that in their installed position they form a compact chain wheel 1 which transmits the drive torque to the scraper chains. Instead of this, however, axial pegs may be disposed on one chain star wheel part which fit into corresponding blind holes in the other chain star wheel part, so that the chain star wheel parts are rigidly joined to each other.

Figure 7:
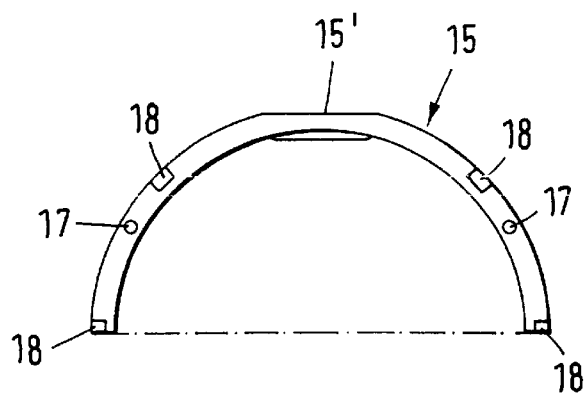
FIG. 7 is a partial view of an individual retaining ring of the chain drum arrangement shown in FIG. 1.
Figure 4A:
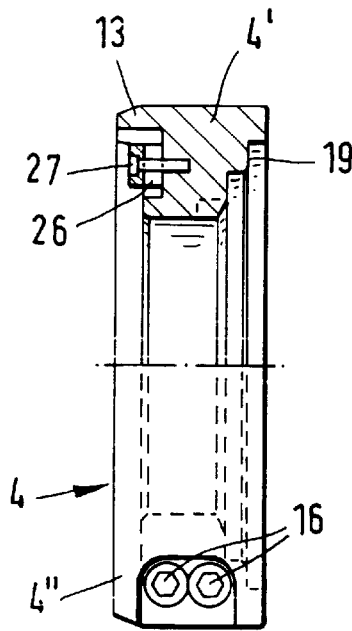
FIGS. 4A and 5A are illustrations corresponding to FIGS. 4 and 5, showing a modified design of the divided locking ring.
Figure 5A:
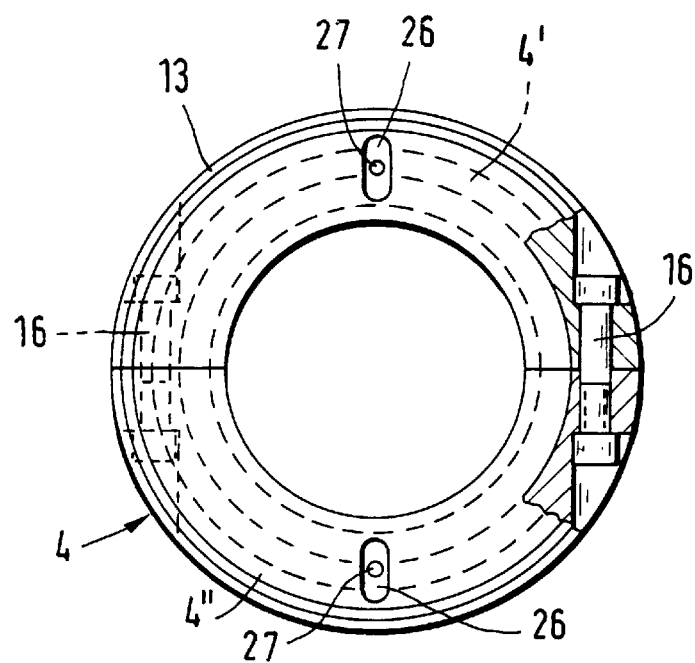

In the embodiment shown, the locking ring 4 is designed as a divided ring, whilst the locking ring 5 consists of a one-piece, closed ring part. Both locking rings have an annularly encircling retaining collar 13 on their external circumference, which fits over an annular lateral shoulder 14 on the respective side face of the chain wheel 1, or of its chain star wheel part, with a radial clearance. A smaller retaining ring 15 is placed on the two annular lateral shoulders 14 of the divided chain wheel 1 from the side. This smaller retaining ring surrounds the two chain wheel segments 1' and 1" of the chain star wheel parts 1A and 1B and keeps them in engagement with the splined portion 8, wherein the retaining rings 15 are covered by the retaining collars 13 of the locking rings 4 and 5. The locking rings 4 and 5 are coupled locked in rotation to the divided chain wheel 1 via the retaining rings 15, so that the locking rings are entrained by the rotating chain wheel 1 during a conveying operation. In the embodiment shown, the rotational entrainment of the locking rings 4 and 5 is effected via their rotationally locked attachment to the retaining rings 15, which are seated on the annular lateral shoulders 14 and which are entrained by the chain wheel. As shown in FIG. 7, these retaining rings have a flattened portion 15', advisedly two diametrically opposed flattened portions 15', on their external circumference, by means of which the rotational entrainment of the locking rings 4 and 5 is effected when the chain drum rotates. The flattened portions on the inside of the retaining collar 13 are indicated by 13' in FIGS. 4 and 5.

As shown in FIG. 1, the two chain star wheel parts 1A and 1B of the chain wheel 1 can also be detachably joined at their mutually facing side faces via a retaining ring 15 which embraces a corresponding annular shoulder face of the respective chain star wheel part, wherein the annular shoulder face is formed here by the sides of an annular groove 15' in the respective chain star wheel part. FIG. 1 also shows that the locking ring 5 has a recess on the inside of its outer retaining collar 13, which recess can receive a plurality of retaining rings 15 of the said type disposed side by side and which thus forms a storage space for retaining rings such as these, which can be used if need be for encompassing the chain wheel segments of the divided chain wheel 1 or of its chain star wheel parts 1A and 1B.

Figure 4:
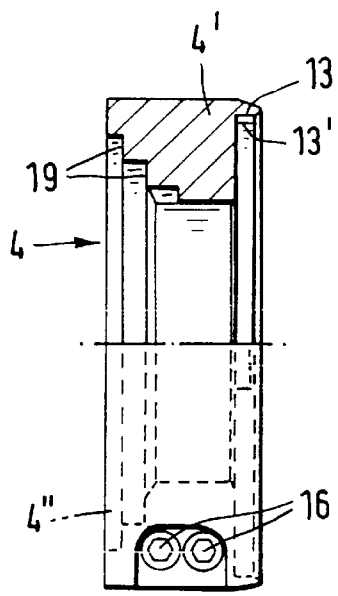
FIG. 4 is a partial section through the locking ring used in the chain drum arrangement shown in FIG. 1.
Figure 5:
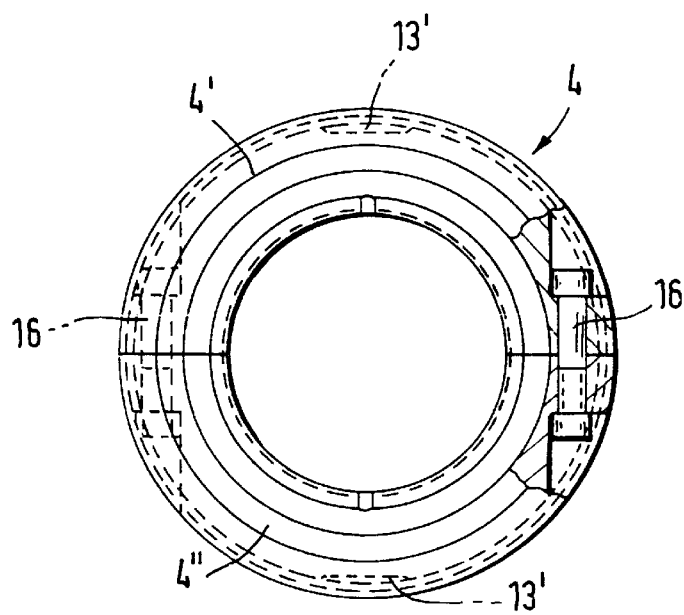
FIG. 5 is a view of the locking ring shown in FIG. 4.

As shown in FIGS. 4 and 5, the divided locking ring 4 consists of two half ring parts or ring segments 4' and 4", which are detachably joined to each other via screws 16 which pass through holes in the ring segments. As shown in FIG. 4, two parallel screws 16 are provided on each side of the ring segments 4' and 4", and are disposed parallel to the tangential direction of the shaft 2. In the embodiment shown, the second locking ring 5 is constructed as a one-piece closed ring. Instead of this, however, it may be designed as a divided locking ring corresponding to the locking ring 4.

Figure 6:
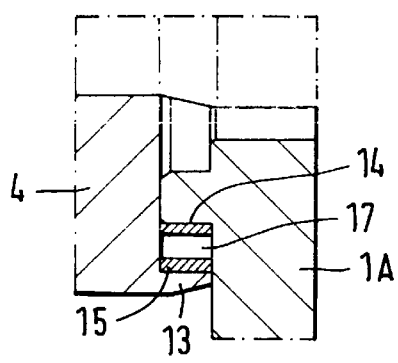
FIG. 6 shows area VI from FIG. 1 on an enlarged scale.

In order to remove and take off the retaining ring 15 situated there from the annular lateral shoulder 14 of the divided chain wheel after removing the divided locking ring 4, the retaining ring 15 has a plurality of tapped holes 17, as shown in FIGS. 6 and 7, distributed over the circumference of its ring, into which a pulling-off screw, which is not illustrated, can be screwed from the location where the locking ring 4 was previously situated in its installed position. With this pulling-off screw, the locking ring in FIG. 1 can be pulled off from the lateral shoulder towards the left. Instead of this, or in addition thereto, a plurality of recesses 18, e.g. small blind holes or the like, may be disposed on the retaining ring 15 over the circumference thereof, into which a tool can be introduced in order to pull off the retaining ring from the lateral shoulder 14.

The divided locking ring or locking rings are advisedly installed so that its or their diametrically extending plane(s) of separation are displaced circumferentially in relation to that of the divided chain wheel 1 or of its chain star wheel parts 1A and 1B.

As shown in FIG. 1, the chain drum has gap ring seals which close the gaps between the locking rings 4 and 5 and the fixed hollow journal 7. In this respect, the locking rings 4 and 5 are each provided with a stepped, annular internal recess 19 for receiving the sealing element of the gap ring seal, as shown in FIG. 4 in particular. The gap ring seals consist here of sliding ring seals known in the art. The sliding ring support 20 thereof, with the metal sliding ring 21 disposed thereon, which rotates with the shaft 2, is attached locked in rotation and detachably to the locking ring 4 or 5, and the sliding ring support 22 thereof, with the sliding ring 3 disposed thereon, which is fixed during the rotary movement of the chain drum, is mounted at the opening of the respective hollow journal 7. The sliding ring support 20 which rotates with the shaft 2 and the chain wheel 1 is attached locked in rotation via axial pegs or dowel pins 24 to the respective locking ring 4 or 5. In this respect, the locking rings 4 and 5 have grooves 25 on their internal circumference which are open towards the shaft 2 for the axial engagement of the pegs or dowel pins 24. On detaching the divided locking ring 4 and taking off its two ring segments 4' and 4" radially from the shaft 2, the respective sliding ring support 20, with its sliding ring 21, thus remains in its installed position on the shaft 2.

FIGS. 1 and 10A show the chain drum arrangement described above with the chain drum in its installed position.

In order to remove the chain wheel 1 which is divided in the manner described, the locking ring 4 is opened by removing its screws 16, whereupon its two ring segments 4' and 4" are taken off radially from the shaft 2 as indicated by the arrows R in FIG. 10A. Subsequently, as shown in FIG. 10B, the retaining ring 14, which is situated at the opening position of the chain drum, is pulled off axially from the chain wheel 1. As described above, this is effected, for example, by using a pulling-off screw which is screwed into a tapped hole 17 or by means of a tool inserted in a recess 18 in the retaining ring. The retaining ring which is detached from the chain wheel can be placed on a shoulder of the hollow journal 7 or of the sliding ring support 22 disposed therein. When this has been done, the left-hand chain star wheel part 1A is displaced axially-towards the hollow journal 7 situated here, as indicated by the arrows S in FIG. 10B, whereupon it is separated from the right-hand chain star wheel part 1B, which at first remains in its installed position. The chain star wheel part 1A thus reaches the position shown in FIG. 10C, in which its two shell-type chain wheel segments 1' and 1" are out of engagement with the splined portion 8 of the shaft 2 and can therefore be taken off radially from the shaft 2 after detaching the second retaining ring 15 in the direction of the arrow R. Subsequently, as shown in FIG. 10D, the right-hand chain star wheel part 1B can likewise be displaced in the direction of the arrow S into the position shown in FIG. 10E, in which its rotationally locked attachment to the splined portion 8 of the shaft 2 is released, so that after detaching its two retaining rings 15 its chain wheel segments 1' and 1" can then be taken of in the direction of the arrow R from the shaft 2. FIG. 10F shows the situation after the complete removal of the chain wheel 1.

Installation of the divided chain wheel 1 is correspondingly effected using the reverse sequence of operations, and the respective locking ring 4 is again brought into its installed position as shown in FIGS. 1 and 10A and is closed there by means of its screws 16. The arrangement of the dowel pin 11 ensures that during the installation of the chain wheel 1 its chain star wheel parts 1A and 1B are installed in the correct positions in relation to each other, i.e. are installed with the circumferential displacement of their planes of separation as shown in FIGS. 2 and 3.

Figure 9:
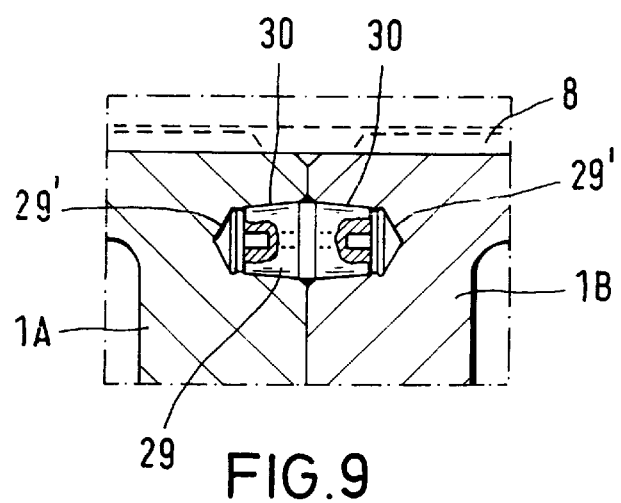
FIG. 9 illustrates the bolted connection of the chain star wheel parts shown in FIG. 8, on an enlarged scale.
Figure 8:
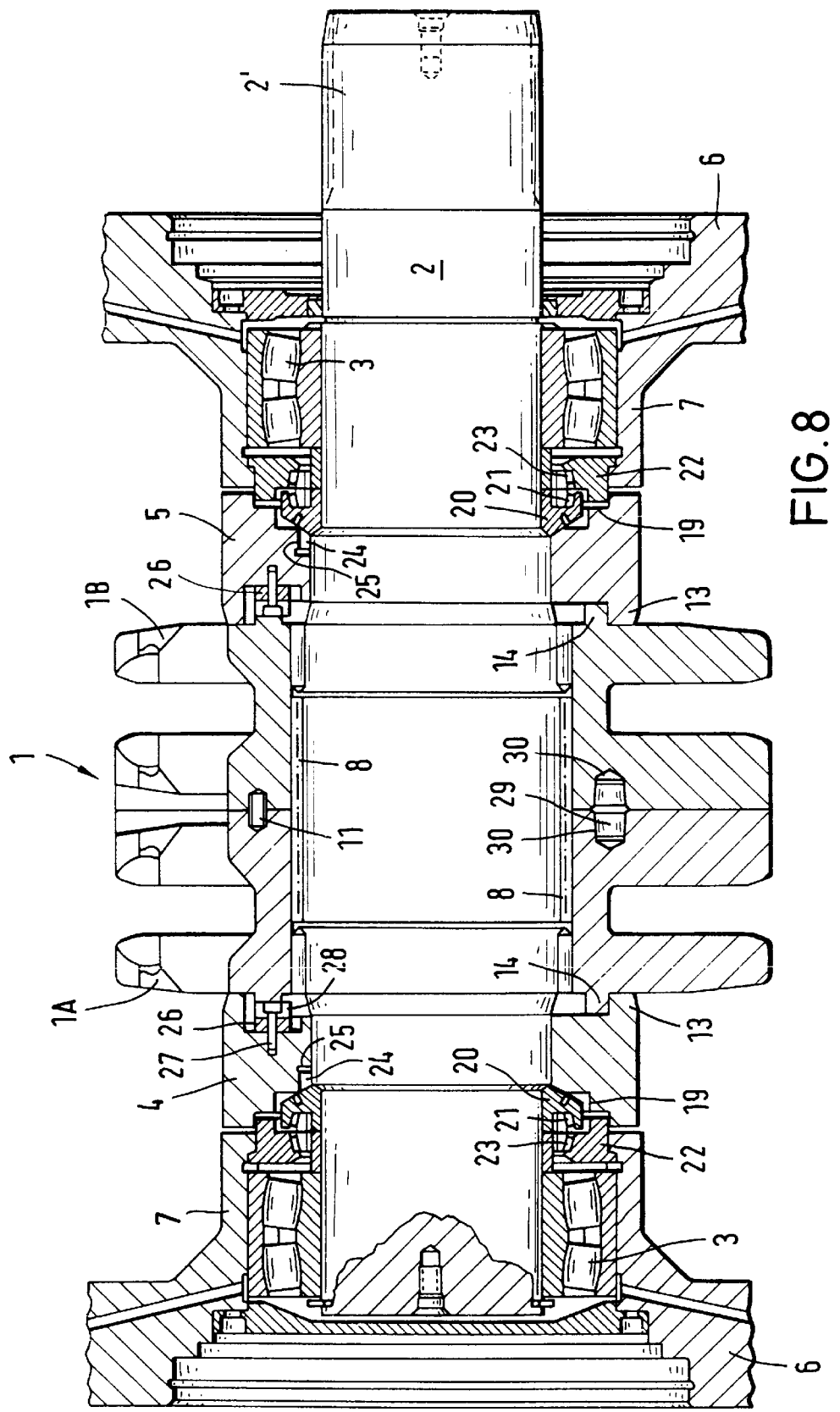
FIG. 8 is an illustration corresponding to that of FIG. 1, showing a slightly modified design of a chain drum arrangement according to another embodiment of the invention.

FIGS. 4A, 5A, 8 and 9 show the arrangement described above with some detailed modifications. It can be seen from FIGS. 4A and 5A in particular that the locking rings 4 and 5 have small cams 26 underneath the annular retaining collar 13 on their faces facing the chain drum 1, which in the embodiment shown are cams which are displaced by 180° in relation to each other and which consist of small cam plates screwed on by means of axial screws 27. As can be seen from FIG. 5A, these cam plates have an approximately oval contour. When the locking rings 4 and 5 are in their installed positions, these cams 26 engage in corresponding recesses on the side faces of the divided chain wheel 1, whereby a rotationally locked attachment to the chain wheel 1 is produced which effects rotational entrainment of the locking rings 4 and 5. Furthermore, FIGS. 8 and 9 show the bolted connection of the two chain star wheel parts 1A and 1B of the chain wheel 1 by means of bolts 29 which engage in axial blind holes 30 in the side faces of the chain star wheel parts 1A and 1B, and the ends of which bolts are of tapered design corresponding to the base of the blind holes. In other respects, the features described in connection with the embodiment shown in FIGS. 1 to 7 are applicable to this modified design.

The invention is not restricted to the examples of embodiments described above. For example, the chain wheel 1 of a central scraper chain conveyor which only comprises a single scraper chain circulating centrally-in the conveying pan can also be designed as a single chain wheel which comprises a single chain star wheel only, wherein, however, the chain wheel 1 is of divided construction in this situation also, i.e. it consists of two shell-type chain wheel segments 1' and 1". Moreover, both the locking rings 4 and 5 may consist of divided locking rings in the manner described, so that the divided chain wheel can be removed from the left or right side according to choice and can correspondingly be installed from one side or the other according to choice. Moreover, it can be seen from the drawings that, as seen in the direction of the axis of the shaft 2, the locking rings 4 and 5 can be of relatively small width dimensions. On a divided chain wheel 1 for a double central scraper chain conveyor in particular, a contribution is made in this respect in that the length of the splined portion 8 of the shaft 2 is less than the overall width of the chain wheel 1, as shown in FIGS. 1 and 8. The chain drum arrangement according to the invention makes it possible easily and rapidly to replace the chain wheels, which are subjected to increased wear, and is primarily intended for central and double central scraper chain conveyors which are used in mining. Due to the locking rings disposed on each side of the divided chain wheel, the divided chain wheel is secured in its installed position on the shaft, mainly against axial displacement in the direction of the shaft axis, whilst the retaining rings which are preferably provided hold the chain wheel segments together and ensure the radial engagement thereof in the splined portion.

We claim:

1. A chain drum arrangement for central or double central scraper chain conveyors of the type having a machine frame with side cheeks with hollow journals for receiving bearings, said journals projecting axially from said side cheeks towards an interior of the conveyor, the chain drum arrangement comprising:

a shaft having a shaft section with a splined portion;

shaft bearings engageable in said hollow journals to mount said shaft on said machine frame;

a divided chain wheel mounted on said shaft, said chain wheel comprising shell-type chain wheel segments having axial splined portions for engagement with said splined portion of said shaft to rotatably lock said chain wheel segments to said shaft; and ring parts disposed around said shaft on either side of said chain wheel to secure said chain wheel in an installed position on the shaft, at least one of said ring parts being a divided locking ring;

said divided locking ring being disposed between said chain wheel and a respective said hollow journal, rotating with said chain wheel, and having locking ring segments which are detachably joined to each other and which, when detached, can be removed from said shaft in a radial direction; and said at least one ring part having a thickness in the longitudinal direction of the shaft which is no less than a displacement distance of said chain wheel along said shaft necessary to release the chain wheel from said splined portion of said shaft.

2. A chain drum arrangement according to claim 1, wherein both said ring parts are divided locking rings which can be taken off radially from said shaft.

3. A chain drum according to claim 2, wherein said divided locking rings are both disposed, one either side of said chain wheel, between said chain wheel and a respective said hollow journal.

4. A chain drum arrangement according to claim 1, wherein one said ring part is said divided locking ring and another said ring part is a one-piece, closed locking ring.

5. A chain drum arrangement according to claim 1, wherein said ring parts are detachably coupled to said divided chain wheel for rotational entrainment.

6. A chain drum arrangement according to claim 1, wherein said divided locking ring comprises ring segments which are detachably joined by a screwed connection comprising screws disposed approximately parallel to a tangent of the shaft.

7. A chain drum arrangement according to claim 1, wherein said chain wheel has annular lateral shoulders and said ring parts have annular retaining collars which fit round said annular lateral shoulders of said divided chain wheel.

8. A chain drum arrangement according to claim 1, wherein a plane of separation of said divided locking ring is displaced circumferentially in relation to a plane of separation of said divided chain wheel.

9. A chain drum arrangement according to claim 1, wherein gap ring seals are provided which close the gaps between said ring parts and said fixed hollow journal.

10. A chain drum arrangement according to claim 9, wherein said ring parts are provided with an annular internal recess, which is preferably stepped, for receiving a sealing element of said gap ring seal.

11. A chain drum arrangement according to claim 10, wherein said gap ring seals are sliding ring seals having a rotating sliding ring support which rotates with said shaft and is detachably attached, locked in rotation, to the respective ring part, and a fixed sliding ring support which is disposed in said hollow journal.

12. A chain drum arrangement according to claim 11, wherein said rotating sliding ring support is rotatably locked to the respective ring part via axial pegs or dowel pins, said ring parts having grooves on their internal circumference opening towards said shaft for the detachable engagement of the pegs or dowel pins.

13. A chain drum arrangement according to claim 7, wherein said shell-type chain wheel segments of the divided chain wheel are detachably joined, on the locking ring side at least, via a removable retaining ring.

14. A chain drum arrangement according to claim 13, wherein said retaining ring is disposed on said annular lateral shoulder of the divided chain wheel over which the retaining collar of the ring part fits.

15. A chain drum arrangement according to claim 13, wherein said retaining ring is provided with tool insertion openings and/or with tapped holes for a pulling-off screw.

16. A chain drum arrangement according to claim 13, wherein said retaining collar covers said retaining ring and said retaining collar and retaining ring are provided with cooperating formations, such as flattened portions for example, on their external or internal contour, which serve for the positive rotational attachment of these parts.

17. A chain drum arrangement according to claim 1, wherein said ring parts comprise cams on their face facing said chain wheel, which cams engage in recesses on the side faces of the chain wheel.

18. A chain drum arrangement according to claim 1, wherein the width of said ring parts is less than that of the divided chain wheel.

19. A chain drum arrangement according to claim 1, wherein said axial splined portion only extends over part of the width of the installed chain wheel in the central region of the shaft.

20. A chain drum arrangement according to claim 1 for a double central scraper chain conveyor, wherein said chain wheel of said chain drum comprises two chain star wheel parts which are disposed side by side on said shaft, each of said star wheel parts being formed from two shell-type chain wheel segments.

21. A chain drum arrangement according to claim 20, wherein planes of separation of said two chain star wheel parts are displaced circumferentially in relation to each other, preferably by 60° to 70°.

22. A chain drum arrangement according to claim 20, wherein said two chain star wheel parts are detachably and rotationally locked together via an axial positioning pin.

23. A chain drum arrangement according to claim 20, wherein said two chain star wheel parts are detachably and rotationally locked together via an axial bolted connection.

24. A chain drum arrangement according to claim 23, wherein said chain star wheel parts comprise blind holes disposed on a common reference circle on their mutually facing side faces, for the engagement of axial tapered bolts.

25. A chain drum arrangement according to claim 1, wherein said chain wheel comprises two shell-type chain wheel segments of different arc lengths and numbers of teeth, wherein the plane of separation of the chain wheel is a kinked plane of separation, the two limbs of which are inclined in relation to each other at an obtuse angle, preferably of 110° to 120°, wherein the plane of separation of the chain wheel cuts the surface of said chain wheel at tooth gaps between teeth of the chain wheel.

* * * * *